United States Patent [19]

Hall

[11] Patent Number: 5,307,917
[45] Date of Patent: May 3, 1994

[54] EXTENDIBLE CONVEYOR STRUCTURE

[75] Inventor: Kevin R. Hall, New South Wales, Australia

[73] Assignee: MECO Australia Pty Limited, New South Wales, Australia

[21] Appl. No.: 976,210

[22] Filed: Nov. 13, 1992

[30] Foreign Application Priority Data

Nov. 14, 1991 [AU] Australia .................. PK9494

[51] Int. Cl.⁵ .............................................. B65G 21/14
[52] U.S. Cl. .................................... 198/313; 198/812
[58] Field of Search ............................. 198/313, 812

[56] References Cited

U.S. PATENT DOCUMENTS

| | | | |
|---|---|---|---|
| 2,169,890 | 8/1939 | Zink | 198/313 |
| 2,815,849 | 12/1957 | Zumbrunnen | 198/313 |
| 2,880,849 | 4/1959 | Craggs et al. | 198/313 |
| 3,378,125 | 4/1968 | Fogg | 198/812 |
| 3,788,452 | 1/1974 | McWilliams | 198/313 |
| 3,825,107 | 7/1974 | Cary et al. | 198/313 |
| 3,826,353 | 7/1974 | Greasley | 198/313 |
| 3,945,484 | 3/1976 | Oury | 198/313 |

*Primary Examiner*—Joseph E. Valenza
*Attorney, Agent, or Firm*—Klarquist Sparkman Campbell Leigh and Whinston

[57] ABSTRACT

Disclosed is an extendible conveyor structure (10). Structure (10) comprises a main frame (11) supported above a ground surface by way of wheels (20). Main frame (11) comprises a number of vertical members (22) and cross-members (18) extending therebetween. Main frame (11) further comprises a number of longitudinal members (23). Either fixed to main frame (11) or rollably supported thereby is a sub-frame (14) to support a conveyor belt (16). Rollably supported to sub-frame (14) is a pair of movable sub-frames (12, 13). The conveyor belt (16) spans all three sub-frames (12, 13 and 14) and is supported by rollers (15) or alternatively by troughing plates or a combination of both. The respective sub-frames (12, 13 and 14) may be manually or automatically extended between a loading zone and a discharge zone as required. Upon activation of the conveyor drive arrangement (19), the conveyor belt (16) is set in motion and bulk materials will pass from extended sub-frame (12) onto the belt at sub-frame (14), and from sub-frame (14) onto the belt at sub-frame (13). The bulk materials will then be delivered at the discharge end.

4 Claims, 5 Drawing Sheets

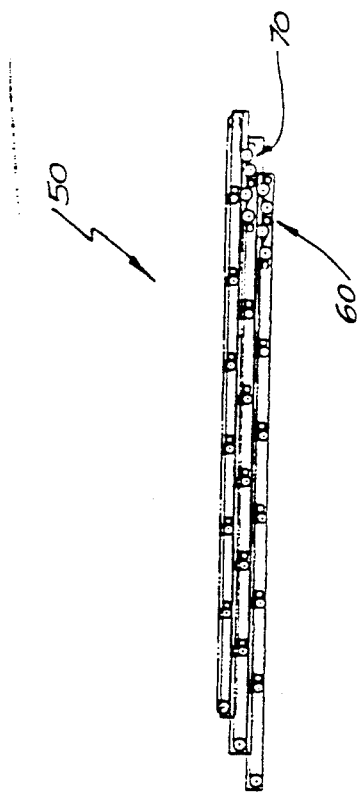
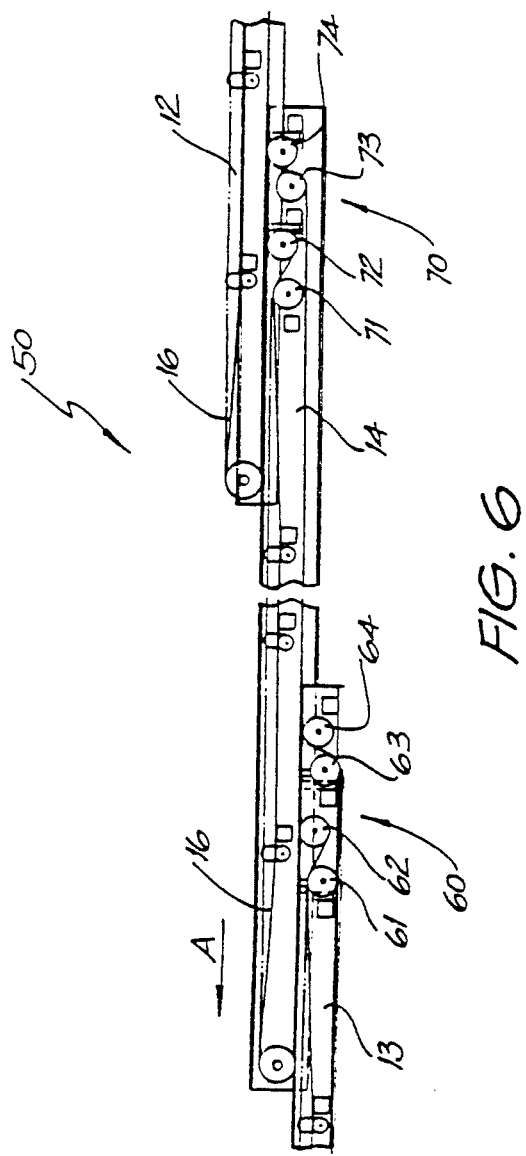

EXTENDIBLE CONVEYOR STRUCTURE

FIELD OF THE INVENTION

The following invention relates to a conveyor structure and more particularly, though not exclusively the invention relates to a conveyor structure comprising a frame to which a plurality of extendible conveyor segments are mounted.

There is often a need to convey bulk materials over a relatively short distance. It would be convenient to have a transportable conveyor structure which may be located between the desired loading and delivery positions which may be extended between those positions.

DISCLOSURE OF THE INVENTION

There is disclosed herein an apparatus comprising:
a main frame, and at least one conveyor sub-frame mounted to the main frame and supporting a conveyor belt, the sub-frame being adapted to move relative to the main frame in the direction of extent of the conveyor belt.

Preferably a fixed sub-frame is mounted to the main frame. In this instance the moveable sub-frame(s) is/are adapted to be slideably supported by the fixed sub-frame.

Preferably the sub-frames, in a retracted configuration are located one above another, supported by the main frame.

Preferably in a situation where three sub-frames are provided, one may be fixed, whereas the remaining two are adapted to extend away from opposing ends of the fixed sub-frame or from one end only.

Preferably a single conveyor belt is provided which serve all sub-frames.

Preferably the main frame is supported by wheels to allow relocation thereof. These wheels may be driven.

In accordance with the above disclosed apparatus, a single belt with a constant belt length can be expanded or retracted by any increment.

The apparatus may be bridged from end to end, or supported from one end only.

BRIEF DESCRIPTION OF THE DRAWINGS

A preferred form of the present invention will now be described by way of example with reference to the accompanying drawings, wherein:

FIG. 5 is a schematic side elevational view of an alternative extendible conveyor structure in a retracted configuration, and FIG. 6 is a schematic partial side elevational view of the structure of FIG. 5 in an extended configuration.

DETAILED DESCRIPTION OF THE PREFERRED EMBODIMENT

Figure 1:
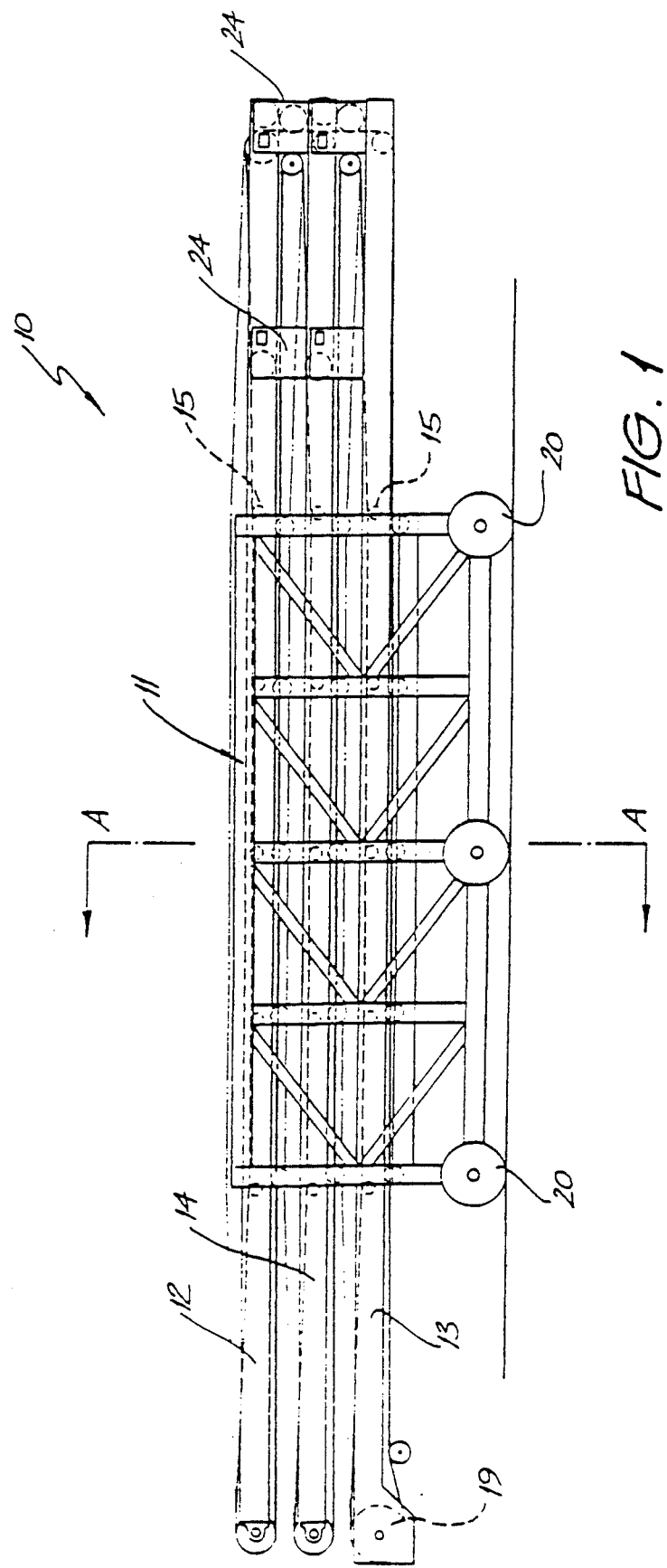
FIG. 1 is a schematic side elevational view of an extendible conveyor structure in a retracted configuration.

In FIGS. 1 to 4 of the accompanying drawings there is schematically depicted an extendible conveyor structure 10. Structure 10 comprises a main frame 11 supported above a ground surface by way of wheels 20. Main frame 11 comprises a number of vertical members 22 and cross-members 18 extending therebetween. Main frame 11 further comprises a number of longitudinal members 23.

Either fixed to main frame 11 or rollably supported thereby is a sub-frame 14 to support a conveyor belt 16. Rollably supported to sub-frame 14 is a pair of moveable sub-frames 12 and 13. The conveyor belt 16 spans all three sub-frames 12, 13 and 14 and is supported by rollers 15 or alternatively by troughing plates or a combination of both.

Sub-frame 14 may either be fixed to main frame 11 or rollably mounted thereto by way of frame rollers 17. Sub-frame 12, as well as sub-frame 13 are supported by sub-frame 14 by way of rollers mounted to guide brackets 24 attached to sub-frame 14. Accordingly, sub-frames 12 and 13 may be extended and retracted as required.

As an alternative sub-frames 12 or 13 may be fixed to main frame 11 in which case, for example, if sub-frame 12 were fixed then sub-frame 12 would support sub-frame 14 and sub-frame 14 would support sub-frame 13. The extendable conveyor sub-frames would then extend from one end or the other.

Figure 2:
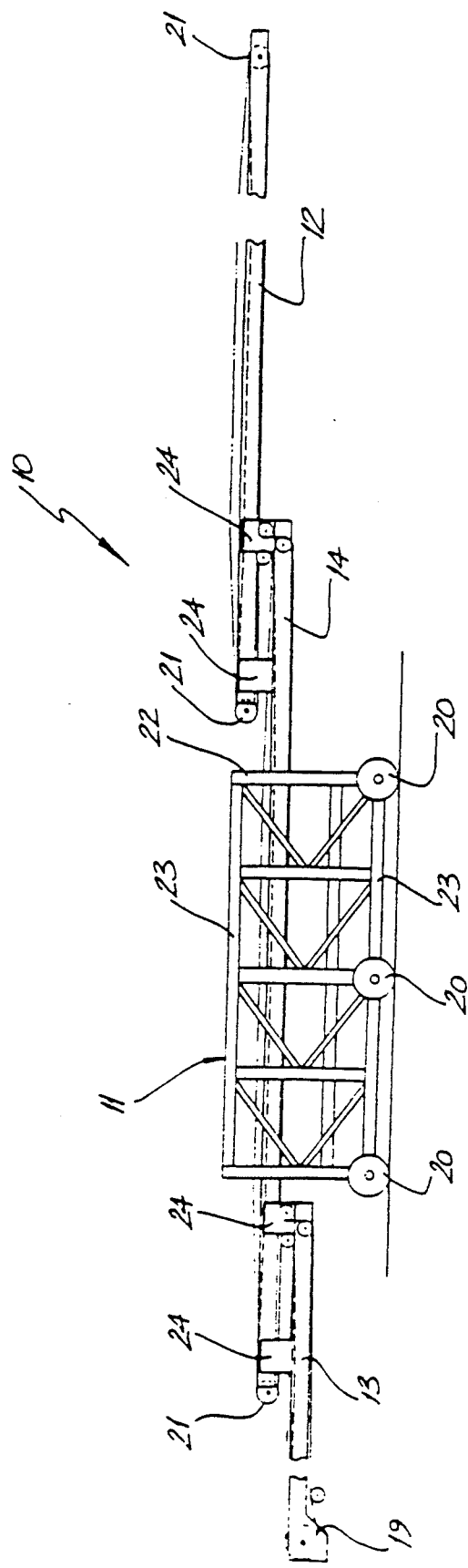
FIG. 2 is a schematic elevational view of the structure of FIG. 1 in an expanded configuration.
Figure 3:
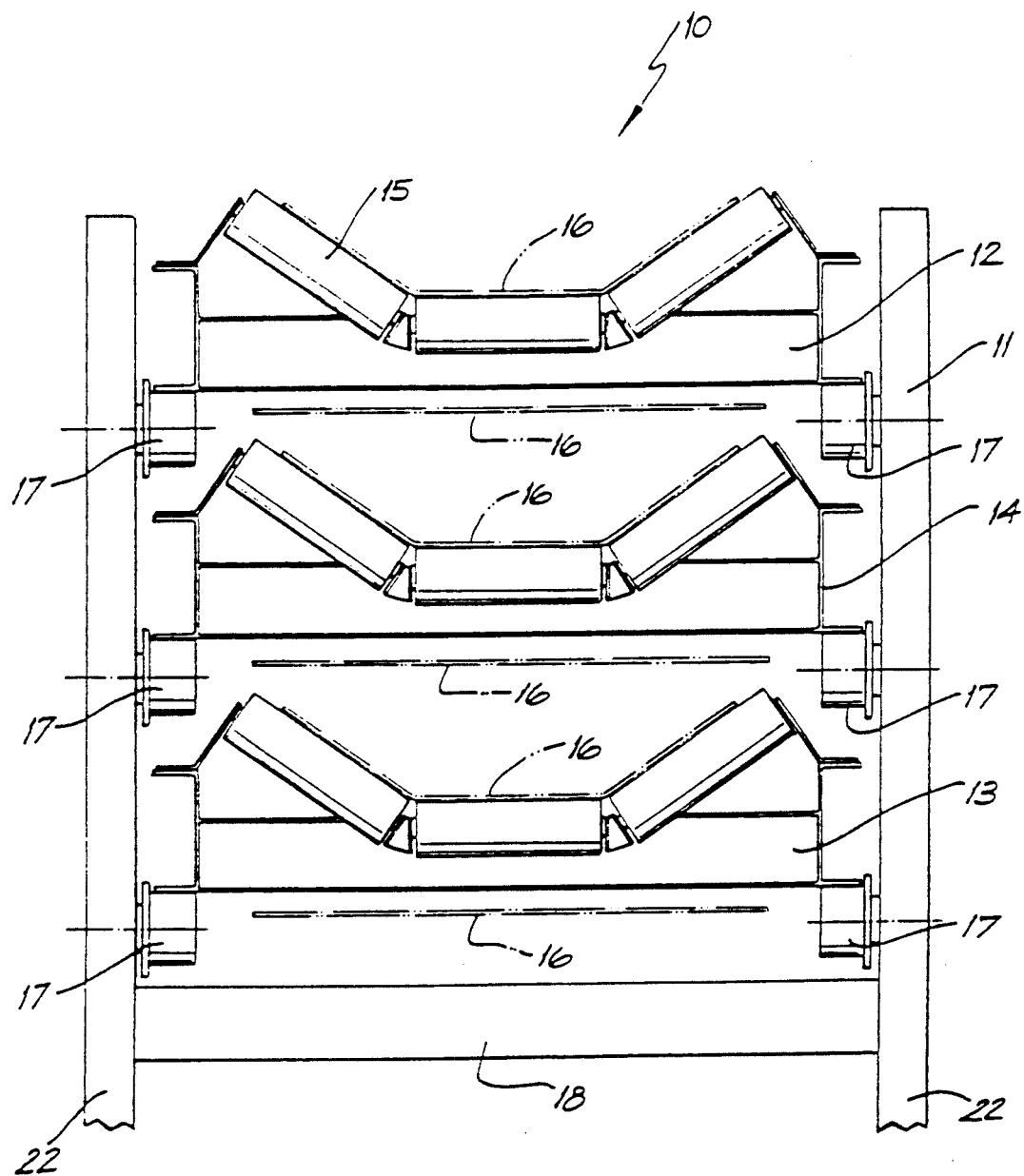
FIG. 3 is a schematic cross-sectional end elevational view taken along line A—A of FIG. 1.
Figure 4:
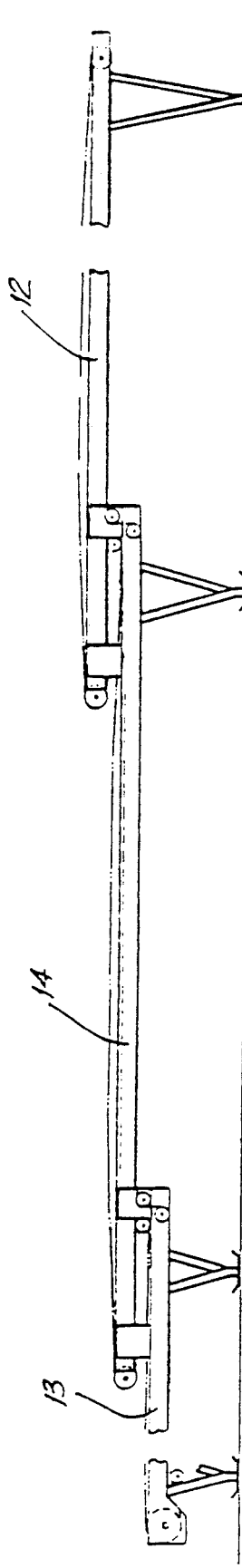
FIG. 4 shows sub-frames extended between loading and discharging points and supported at these ends or intermediate points without the use of the mobile main frame 11.

A conveyor drive arrangement 19 is provided at the discharge end of the conveyor structure 10. Drive arrangement 19 draws the conveyor belt 16 toward the left along sub-frame 13. The belt 16 extends around a pulley to sub-frame end rollers 21 and from the other end of sub-frame 14 the conveyor belt 16 extends around a further pulley to a like end roller 21 of sub-frame 12. The conveyor belt 16 returns to drive pulley 19 via the rollers as indicated in FIG. 2.

In use the structure 10 may be moved to its site of application by way of wheels 20. The respective sub-frames 12, 13 and 14 may then be either manually or automatically extended between a loading zone and a discharge zone as required. Upon activation of the conveyor drive arrangement 19 the conveyor belt 16 is set in motion and bulk materials will pass onto extended sub-frame 12 and pass therealong falling onto the belt at sub-frame 14 and from sub-frame 14 onto the belt at sub-frame 13. The bulk materials will then be delivered at the discharge end.

In FIGS. 5 and 6 of the accompanying drawings there is schematically depicted an alternative extendible conveyor structure 50. Structure 50 is for all intents and purposes similar in construction and operation as structure 10 depicted in FIGS. 1 to 4. As best depicted in FIG. 6, a pair of roller sets 60 and 70 are provided. The first set 60 is mounted upon sub-frame 13 whereas the second set 70 is mounted upon sub-frame 14.

Roller set 60 comprises rollers 61, 62, 63 and 64 whereas roller set 70 comprises rollers 71, 72, 73 and 74. Belt 16 travelling in a leftward direction indicated by arrow A in FIG. 6 passes about the leftmost return roller of sub-frame 14, then passes over and around roller 62 in a clockwise direction and over roller 61 to then pass in a leftward direction along sub-frame 13. Upon returning from the leftmost roller (not shown) in FIG. 13, belt 16 will pass below rollers 61 and 62, about roller 63 in an anti-clockwise direction, then over roller 64 so as to rotate the same in a clockwise direction. The belt then passes in a right hand direction to roller 73 which rotates anti-clockwise, then over roller 74 causing the same to roll in a clockwise direction. The belt then passes to the rightmost return roller of sub-frame 12 where it extends to the upper surface thereof. Upon returning about the left hand roller of sub-frame 12, belt 16 passes over and about roller 72 to cause rotation thereof in a clockwise direction, then over roller 71 to cause anti-clockwise rotation thereof at which point the belt 16 extends along sub-frame 14 to repeat the cycle.

It should be appreciated that modifications and alterations obvious to those skilled in the art are not to be considered as beyond the scope of the present invention. For example any practical number of sub-frames may be provided.

I claim:

1. An extendible conveyor structure comprising:
   a main frame adapted to be supported upon a ground surface;
   a first elongate conveyor belt support frame supported by the main frame;
   a second elongate conveyor belt support frame movably mounted to and above the first conveyor belt support frame and adapted to transfer linearly between a retracted position upon the first conveyor belt support frame, and an extended position cantilevered from one end of the first conveyor belt support frame;
   a third elongate conveyor belt support frame movably mounted to and below the first conveyor belt support frame and adapted to transfer linearly between a retracted position beneath the first conveyor belt support frame, and an extended position cantilevered from the other end of the first conveyor belt support frame; and
   an endless conveyor belt spanning the first, second and third conveyor belt support frames, and adapted to be expanded or retracted as the second and third conveyor belt support frames transfer linearly.

2. The extendible conveyor structure of claim 1 further comprising ground engaging wheels upon the main frame.

3. The extendible conveyor structure of claim 1 or claim 2 further comprising a conveyor belt drive arrangement provided at a remote end of the second or third conveyor belt support frames.

4. The extendible conveyor structure of claim 3 wherein the first, second and third elongate conveyor belt support frames are configured to provide a troughed upper surface for the endless conveyor belt.

* * * * *